Patented July 20, 1954

2,684,312

UNITED STATES PATENT OFFICE 2,684,312

SHAPED BORAX-BORIC ACID FLUX BODIES

René D. Wasserman, Stamford, Conn., assignor to Eutectic Welding Alloys Corp., Flushing, N. Y., a corporation of New York No Drawing. Application December 20, 1949, Serial No. 134,135

2 Claims. (Cl. 148—24)

My present invention relates to a new form of flux to be employed in welding, brazing, hard soldering and like metal joining operations carried out at temperatures above 800° F. More particularly, it concerns flux bodies essentially comprising borax and boric acid, which may be formed into any desired shape, such as rods or cakes, and employed in the gas welding and brazing of ferrous and non-ferrous metals.

The fluxes heretofore employed in metal joining processes at temperatures above 800° F. have invariably been used either in paste or powder form. While shaped flux bodies have been suggested for use in soft soldering operations (conducted at temperatures substantially below 800° F.), such flux bodies were composed largely of fats, waxes, rosins, volatile salts, readily fusible metals and the like, so that they were useless as fluxes at temperatures of the order employed in the hard soldering, brazing and welding operations (above 800° F.).

There are numerous disadvantages involved in the use of flux in the form of paste or powder. Most important of these are the unavoidable waste of flux material and the difficulty of readily applying the desired quantity of flux to the work. The latter difficulty is particularly evident in the case of overhead welding and brazing.

The main object of this invention is to provide the industry with a flux body of any desired shape, that can be used for metal joining operations at temperatures above 800° F. Another object is to provide such a shaped flux body suitable for use in a variety of different welding, brazing and hard soldering operations. A further object is to eliminate waste of flux material in such operations and to facilitate the application of the desired amount of flux to the work. Additional objects and advantages will become apparent from the following description of my invention.

I have found that the foregoing objects and advantages can be achieved by preparing shaped flux bodies comprising essentially borax and boric acid. The proportions of these two essential ingredients required for the purposes of my invention lie within the range of from about one-half to about nine parts by weight of borax for each part by weight of boric acid. I prefer to employ from one to six parts of borax for each part of boric acid. The particular advantage of these ingredients and proportions is that they may readily be combined in a variety of ways to form shaped flux bodies suitable for use in various metal joining operations at temperatures above 800° F. It is also possible to enhance the properties of such shaped flux bodies by the incorporation of additional ingredients, particularly of alkali metal fluorides, carbonates, chlorides, phosphates, etc., and of various metal powders. By suitable compounding of such ingredients, one can form shaped bodies having predetermined melting points above 800° F., so that the flux applied to the work may be used as a convenient indicator to show when the desired temperature has been reached.

When preparing my novel shaped flux bodies, I generally start with an intimate mixture of finely powdered borax and boric acid within the required range of proportions. To this mixture there may be added further finely divided ingredients, such as alkali metal fluorides, carbonates, chlorides, phosphates, etc., and metal powders. In order to help produce the desired shaped body, I may incorporate a small amount of a suitable binder, such as rosin, starch, dextrose, a water soluble silicate and the like. The binder is conveniently added in the form of a solution in a volatile solvent, for example water or alcohol. Enough of the solution is added to form a very heavy paste which is pressed or extruded into the desired shape. Evaporation of the solvent imparts solidity to the molded product.

Another method of forming my shaped flux bodies, which does not involve the use of an added binder, is to heat the powdered mixture to temperatures above about 220° F. When this is done, the water of hydration, that is chemically bound in the borax ($Na_2B_4O_7 \cdot 10H_2O$) is released, and a clear, heavy syrupy liquid is formed. The presence of boric acid appears essential, since borax alone may be heated far above 220° F. without releasing any water of crystallization. The heavy syrup so obtained may now be recrystallized to form a solid, amorphous mass. Recrystallization is preferably carried out in a receptacle having the desired shape which is imparted to the recrystallized mass. Frequently it is desirable to accelerate the solidification (recrystallization) of the syrup, which may be accomplished in various ways. For example, some of the water released may be evaporated at elevated temperature with or without a vacuum. Alternatively, the syrup may be cooled and seeded by the addition of a few crystals of borax. After solidification, the resultant shaped body is removed from the mold.

A further method for obtaining my novel shaped flux bodies is simply to heat the borax-boric acid mixture far above the liquefaction temperature (about 220° F.), thereby to evaporate off most of the water of hydration, and then to pour the fused mass into suitably shaped molds, in which it solidifies upon cooling.

Each of the above methods will yield a shaped flux body that is suitable for use in metal joining operations at temperatures above 800° F. It possesses sufficient mechanical strength to be handled and shipped without breaking. When the shaped flux body is rubbed upon the metal surfaces to be joined, a small amount of flux will be deposited, leaving a mark that is readily discernible. In the preferred embodiment of my invention, I shape the flux body into the form of a stick or rod of convenient size, so that it may be employed in the manner of a crayon. The advantages of this form in the application to the work are obvious.

The addition, for example, of alkali metal fluorides, such as the sodium and potassium fluorides, to the borax-boric acid mixture will impart to the shaped flux bodies further desirable properties. They improve the surface cleaning and wetting properties of the flux. At the same time, such fluorides lower the melting point of the shaped flux body without impairing its mechanical strength. I prefer to employ up to about 10% by weight of the whole, preferably at least 2%, of such fluorides.

Similarly, alkali metal carbonates, chlorides, phosphates and other alkali metal salts, such as the pentaborates, may be added in minor proportions to impart certain desirable properties to the shaped flux bodies and to influence their melting points.

It is generally desirable that the total amount of all alkali metal salt additions to the borax-boric acid mixture does not exceed about 30% by weight of the whole. The alkali metal salts, particularly the fluorides, can be added at any stage in the production of the shaped flux bodies prior to their solidification. Preferably, they are included in the original powdered mixture from which the shaped bodies are formed.

For some purposes it is desirable to include metal powders in the shaped flux bodies. I have found that such metal powders can be incorporated in amounts up to about 50% by weight of the whole without seriously impairing the mechanical properties of my new shaped flux bodies. As examples of such metal powders, I may mention copper, zinc, tin, iron, silver, nickel, aluminum, magnesium, cadmium and alloys thereof. These metal powders may perform various functions, such as modifying the composition of the filler metal, deoxidizing the weld, and also may constitute the filler metal forming the joint.

Other possible additions are coloring matters that may serve to distinguish various grades. Moistureproof coatings can also be applied.

My invention is illustrated by the following examples, but it is, of course, not limited to the details set forth therein.

Example 1

100 grams of boric acid and 400 grams of borax were finely pulverized and thoroughly mixed together. The mixture was placed in a porcelain dish and was heated at a temperature of about 200° F. for an hour whereupon it was converted to a clear heavy syrup. This syrup was then poured into stainless steel molds and allowed to cool therein to room temperature. Several small crystals of borax were added to each mold, whereupon recrystallization began. After about 1½ hours the entire mass within each mold became solid and could be readily removed in the form of a strong flux body having the shape of the mold.

The molds are preferably of such shape as to produce rods or sticks of convenient size for use in the manner of a crayon. The sticks are milky white in appearance and have sufficient mechanical strength to be handled and shipped without breaking.

Best results may be obtained with these flux sticks, if the metals to be joined are heated slightly before application of the flux. The flux stick is then rubbed lightly over the desired area of the warm metals, leaving a small amount of flux thereon. This leaves a distinct mark, which can easily be seen by the welder who can also gauge by its appearance how heavy a layer of flux has been applied.

The metals to be joined are then heated by suitable means, such as a gas welding torch, to the temperature desired for the welding or brazing operation. The flux sticks produced according to this example will melt at approximately 900° F. As soon as the metals to be joined reach this temperature, there is a definite change in the appearance of the flux coating, which becomes liquid and transparent. This flux coating thus serves as a convenient temperature indicator for the base metals.

Example 2

Flux sticks were prepared exactly as described in the preceding example, except that an amount of powdered sodium fluoride was added to the original powdered mixture, which was equal to 5% by weight of the whole. This sodium fluoride did not interfere with the liquefaction nor with the subsequent recrystallization of the mass. The resultant flux displayed a somewhat lower melting point, i. e., about 860° F. and was particularly suited for use with silver brazing alloys.

Example 3

In this case there was added to the powdered mixture of borax and boric acid described in Example 1 the amount of sodium fluoride specified in Example 2 and a copper alloy powder in an amount equal to 15% by weight of the whole. The added materials were mixed in thoroughly, and the mixture was heated as before. The copper powder remained suspended in the resultant syrup and was distributed uniformly throughout the solidified mass. It rendered the resultant sticks especially suited for use in the brazing of steels.

Example 4

1000 grams of powdered boric acid, 3500 grams of powdered borax and 250 grams of powdered potassium fluoride were intimately mixed. To this powdered mixture there were slowly added, while stirring continued, 450 cubic centimeters of a 40% aqueous solution of dextrose, whereupon the mass became converted to a very heavy paste. This paste was then passed through an extrusion press wherein it was heated to about 180° F. A continuous rod of ¼" diameter was extruded from the press and cut into 6" lengths. Upon cooling in the open air, the resultant rods soon became hard enough to be handled without breakage. They could be used in the same manner as the rods described in Example 1.

As many apparently widely different embodi-

I claim:

1. An extruded uniform, solid, flux stick essentially comprising from about 1 to about 6 parts by weight of borax containing at least a substantial proportion of its normal water of hydration for each part by weight of boric acid, and a small amount of a binder selected from the group consisting of rosin, starch, dextrose and water-soluble silicates.

2. An extruded flux stick essentially comprising from about 1 to about 6 parts by weight of borax for each part by weight of boric acid, up to about 10% by weight of an alkali metal fluoride, up to about 50% by weight of a metal powder, and a small amount of binder selected from the group consisting of rosin, starch, dextrose and water-soluble silicates.

References Cited in the file of this patent

UNITED STATES PATENTS

| Number | Name | Date |
|---|---|---|
| 881,081 | Kovach | Mar. 3, 1908 |
| 923,934 | Benson | June 8, 1909 |
| 940,111 | Ackermann | Nov. 16, 1909 |
| 1,852,463 | Kjellgren | Apr. 5, 1932 |
| 1,946,958 | Anastasiadis | Feb. 13, 1934 |
| 1,991,410 | Newman | Feb. 19, 1935 |
| 2,033,102 | Berry | May 3, 1936 |
| 2,344,195 | Anthony et al. | Mar. 14, 1944 |
| 2,478,944 | Rising, Jr. | Aug. 16, 1949 |

FOREIGN PATENTS

| Number | Country | Date |
|---|---|---|
| 376,043 | Great Britain | July 7, 1932 |